Figure 1:
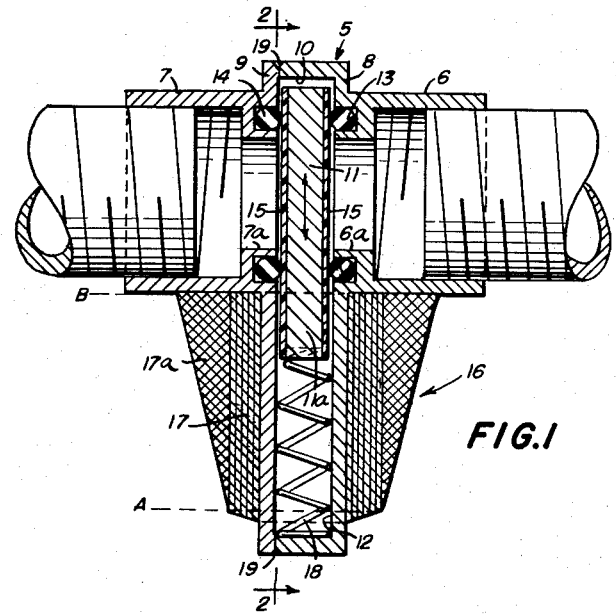

Dec. 10, 1963

P. NIXON 3,113,757

SOLENOID-OPERATED GATE VALVE

Filed Jan. 18, 1961

INVENTOR
PHILLIP NIXON

BY

ATTORNEY 3,113,757
SOLENOID-OPERATED GATE VALVE
Phillip Nixon, 600 Glendale Drive, Glenview, Ill.
Filed Jan. 18, 1961, Ser. No. 83,438
3 Claims. (Cl. 251—141)

This invention relates to gate valves and consists more particularly in new and useful improvements in a solenoid-operated gate valve wherein the gate is normally closed by spring tension and opened upon the energizing of a solenoid.

The primary object of the present invention is to provide a solenoid-operated valve of extremely simple construction and wherein the number of parts is reduced to a very minimum which greatly reduces the possibility of malfunction.

Another object of the invention is to provide a valve of this type wherein the gate is directly activated by the solenoid which is so arranged with respect to the valve gate that the latter lies entirely within the magnetic field which, when energized, activates the gate in opposition to spring tension means.

A further object of the invention is to provide a solenoid-operated gate valve wherein the gate is slidably disposed between two sealing O rings, respectively bounding the upstream and downstream ports in a fluid line, the thickness of the valve gate with relation to the space between the O-rings providing such an exact fit that the valve will function with equal effect whether the pressure in said line is from upstream or downstream, the gate closing across the pressure and not with it or against it.

With the above and other objects in view which will appear as the description proceeds, the invention consists in the novel features herein set forth, illustrated in the accompanying drawings and more particularly pointed out in the appended claims.

Figure 2:
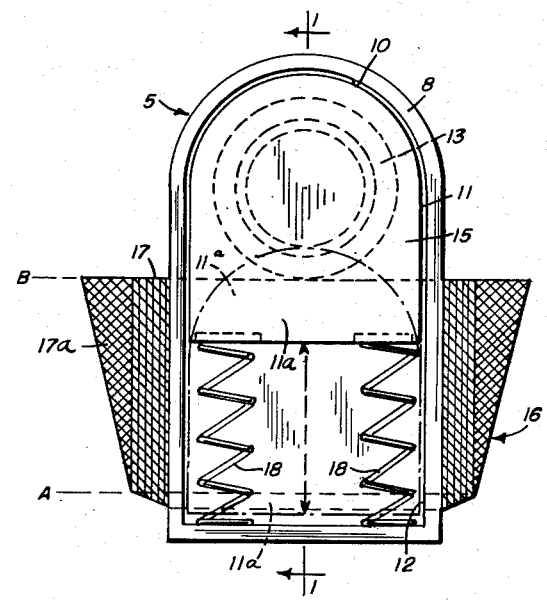

Referring to the drawings in which numerals of like character designate similar parts in both views:

FIGURE 1 is a longitudinal sectional view of the valve assembly, including a fragmentary showing of the upstream and downstream conduits in full lines, and FIGURE 2 is a transverse sectional view taken on line 2—2 of FIGURE 1.

In the drawings, referring first to FIGURE 1, it will be seen that the valve assembly comprises a valve body generally indicated by the numeral 5, which is preferably formed of brass and includes aligned upstream and downstream conduit connections 6 and 7 respectively. In the preferred form of the invention, the body 5 consists of two parts including a housing 8 and a closure plate 9 which jointly form the boundaries of a vertically elongated valve chamber 10. This chamber extends transversely across the housing and receives the valve gate 11 which is mounted for vertical reciprocation from the upper extremity of the chamber 10 into and out of a spring well 12 formed by the extended lower end of the housing 8.

The walls of the housing 8 and closure plate 9, within the confines of the conduit connections 6 and 7, are provided with aligned ports 6a and 7a respectively, between which the valve gate 11 is adapted to slide within the chamber 10. Parallel O rings 13 and 14, located in suitable annular recesses in the walls of the housing and closure plate, bound the ports 6a and 7a and are spaced from one another a distance to effect an exact fit against the adjacent faces of the valve gate 11, to maintain an adequate sealing engagement with both sides of the valve gate, while at the same time permitting its reciprocation for opening and closing as will later appear.

Preferably, the valve gate 11 is formed of stainless steel and the opposite sealing faces thereof are coated with a layer of Teflon or the like 15, in order to increase the life of the O rings 13 and 14. With this arrangement, the sliding contact between two smooth plastic surfaces not only maintains a perfect sealing engagement, but avoids the wear which would ordinarily result from a sliding contact between metal and plastic or neoprene.

Immediately below the conduit connections 6 and 7, the valve body 5 is provided with a solenoid member generally represented by the numeral 16, which surrounds the spring well portion 12 of the housing 8. As diagrammatically shown in the drawings, this solenoid member consists of conventional solenoid windings 17 wound on the spring well member 12 and suitably connected to a source of electric current (not shown) so that its magnetic force acts directly on the valve gate 11 which, as before stated, is reciprocably mounted in the chamber 10 and the well 12, contiguous therewith.

A pair of coil springs 18, transversely spaced in the well 12, are interposed between the lower extremity of the valve gate 11 and the bottom of the well 12, normally urging the gate to its uppermost or closed position between the opposed O rings 13 and 14. Thus, when the solenoid 16 is energized, the magnetic force of the windings 17 retracts the valve gate 11 into the well 12, overcoming the tension of springs 18 and opening the aligned ports 6a and 7a to permit the flow of fluid through the conduit in which the valve body 5 is interposed. Upon de-activation of the solenoid 16, the springs 18 automatically project the valve gate 18 upwardly between the O rings 13 and 14 to close the valve ports.

In some installations, it may be desirable to supplement the conventional solenoid windings 17 with a graduated coil 17a, providing a field which is divided into several sections with graduated magnetic strength. With such an arrangement, as the gate 11 is moved to open position, it will pass from one magnetic field to another, the fields having progressively increasing strength from the lower area A of the windings, to the upper area B, as indicated in the drawings. The stronger field at B is required to initially open the gate 11 and overcome its tendency to remain closed under the influence of the static line pressure acting through the friction force between the O rings 13 and 14 and the gate.

When the gate 11 is in closed position, the solenoid windings encircle only a relatively small mass of the magnetic stainless gate indicated at 11a and extending across the lower end of the gate. Thus, it is advantageous to increase the number of windings at area B of the graduated coil 17a, in order to provide sufficient initial thrust for opening the gate, the thrust being proportional to the number of windings in the upper triangular portion of the coil and the mass of the gate at 11a encircled by these windings.

In this connection and as best seen in FIG. 2 of the drawings, the gate 11 is arcuate at its upper extremity which is accommodated in closed position by the complementary arcuate contour of the upper end of the housing 8, its parallel lateral edges extending downwardly and terminating within the confines of the magnetic windings 17 and 17a at a point below the conduit connections 6 and 7. This extended lower portion 11a of the gate terminates in a straight bottom edge which engages the coil springs 18 and forms a magnetic mass lying within the magnetic windings.

As best seen in FIGURE 1, the assembly of this valve structure is facilitated by arranging the closure plate 9 so that it can be applied to the housing 8 after the valve gate 11 is inserted in the chamber 10 in contact with the housing O ring 13. When the closure plate is applied, the O ring 14 carried thereby embraces the opposite side of the valve gate and the closure plate may be fixed and sealed in place by any suitable means, such as welding at 19 where it joins the housing.

It will be apparent that the valve assembly of the present invention is extremely simple in construction and is readily adaptable to many uses, not only in such appliances as automatic washing machines, but with small instruments such as are employed in present day rocketry. By arranging the solenoid for direct action on the valve gate, the number of parts required are greatly reduced and the likelihood of malfunction is minimized.

Furthermore, the particular arrangement wherein the valve gate cuts across the flow of fluid and is slidably disposed between the opposed O rings, provides a valve which is equally effective in controlling pressures either from upstream or downstream in the fluid line. In this regard, the terms "gate valve" and "valve gate" as used herein are intended to describe a generally rectilinear, flat-sided valve member such as that illustrated at 11 in the drawings.

From the foregoing, it is believed that my invention may be readily understood by those skilled in the art without further description, it being borne in mind that numerous changes may be made in the details disclosed without departing from the spirit of the invention as set forth in the following claims.

I claim:

1. In a valve assembly, a valve body having therein a valve chamber, aligned ports on opposite sides of an opening into said chamber, a sealing ring of flexible material bounding each of said ports, a valve gate slidably mounted in said valve chamber, said valve gate being mounted for sliding movement from a position between and in sealing engagement with said sealing rings to a position laterally removed therefrom, a plastic coating on opposite faces of said valve gate for sliding engagement with said sealing rings, a valve chamber extension laterally offset from said ports and in alignment with said valve chamber for receiving said gate when said gate is retracted from said first-named position, spring means positioned within said extension and operative against one end of said valve gate to urge said valve gate toward said first-named position and a solenoid surrounding said valve chamber extension and acting directly on said gate for sliding said gate to said second-named position, said valve gate having a portion positioned within said chamber and surrounded by said solenoid when said valve gate is in either of said positions.

2. A valve assembly comprising a valve body, a pair of aligned ports in said body, conduit-receiving connections communicating with said ports and extending in opposite directions from said ports, a valve gate member positioned for sliding movement from a position between said ports to a position laterally removed therefrom, said valve gate member when in said first-named position effective to seal said ports against communication one with the other, said valve gate member having a pair of oppositely disposed flat faces, a pair of parallel side edge surfaces, a substantially flat end surface perpendicularly disposed to said side edge surfaces and a curved opposite end portion, a valve body chamber extension aligned with said valve gate member to receive the same, said first-named valve gate member end portion being positioned within said valve chamber extension at all positions of said valve gate member, spring means positioned within said valve chamber extension and operative against said first-named valve gate member end portion to urge said valve gate member toward said first-named position, a solenoid surrounding said valve chamber extension and surrounding said first-named valve gate member end portion within said chamber extension at all positions of said valve gate member, said solenoid comprising a series of magnetic fields of progressively increasing strength in a direction toward said first-named position of said valve gate member, the strongest of said fields immediately adjacent the outer surface of said connections and encircling said first-named valve gate member end portion to provide a maximum initial attraction for the magnetic thrust of the energized solenoid.

3. A solenoid-operated gate valve assembly, comprising a valve body, said body including a valve chamber, aligned ports on opposite sides of and opening into said chamber and conduit-receiving connections communicating with said ports and extending in opposite directions therefrom, a generally rectilinear, flat-sided valve gate mounted in said chamber for sliding movement to and from a closed position between said ports, a generally rectilinear valve chamber extension laterally offset with respect to said ports for receiving said gate when the latter is retracted from closed position, said extension having a length and depth greater than its width, the extremity of said gate in its retracting direction projecting within the confines of said chamber extension adjacent said connections when the gate is in closed position, said extremity comprising in the order of 25 percent of said gate, spring means in said chamber extension normally urging said gate toward said closed position, and a solenoid surrounding and in contact with said chamber extension and acting directly on said gate for retracting the latter from closed position, said solenoid comprising a series of magnetic fields of progressively increasing strength in a direction toward the closed position of said gate, the strongest of said fields encircling said projecting extremity of said gate when said gate is in closed position to provide a maximum initial attraction for the magnetic thrust of the energized solenoid, said solenoid having four side portions, two of said side portions being greater in longitudinal extension than the remaining two of said side portions, the coils of said solenoid comprising the magnetic field of greatest strength being positioned immediately adjacent said connections, substantially the entirety of said gate being within the magnetic field of said solenoid when said gate is in its retracted position.

References Cited in the file of this patent

UNITED STATES PATENTS

| | | |
|---|---|---|
| 521,269 | Michl | June 12, 1894 |
| 1,448,409 | Kindl | Mar. 13, 1923 |
| 2,161,960 | Hintze | June 13, 1939 |
| 2,356,134 | Voit | Aug. 22, 1944 |
| 2,606,740 | Allen | Aug. 12, 1952 |
| 2,627,544 | Eck | Feb. 3, 1953 |
| 2,828,937 | Kreitchman | Apr. 1, 1958 |
| 2,973,183 | Alger | Feb. 28, 1961 |